(12) United States Patent
Jin et al.

(10) Patent No.: US 8,482,704 B2
(45) Date of Patent: Jul. 9, 2013

(54) LIQUID CRYSTAL DISPLAY DEVICE AND MANUFACTURING METHOD THEREOF

(75) Inventors: Hyun Suk Jin, Gyeonggi-do (KR); Hyung Seok Jang, Gyeonggi-do (KR); Tae Han Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 63 days.

(21) Appl. No.: 13/085,790

(22) Filed: Apr. 13, 2011

(65) Prior Publication Data

US 2012/0094569 A1    Apr. 19, 2012

Related U.S. Application Data

(62) Division of application No. 11/826,589, filed on Jul. 17, 2007, now Pat. No. 7,940,358.

(30) Foreign Application Priority Data

Dec. 13, 2006  (KR) .......................... 10-2006-0126763

(51) Int. Cl.
*G02F 1/1335* (2006.01)

(52) U.S. Cl.
USPC ............................. 349/114; 349/191; 438/30

(58) Field of Classification Search
USPC .......... 349/49, 187, 114, 191; 438/30; 437/30
See application file for complete search history.

(56) References Cited

U.S. PATENT DOCUMENTS

| | | | |
|---|---|---|---|
| 5,499,126 A | 3/1996 | Abileah et al. | |
| 5,859,681 A | 1/1999 | VanderPloeg et al. | |
| 5,872,611 A | 2/1999 | Hirata et al. | |
| 5,877,829 A | 3/1999 | Okamoto et al. | |
| 2001/0007487 A1* | 7/2001 | Yoon et al. | 349/106 |
| 2003/0043323 A1 | 3/2003 | Roosendaal et al. | |
| 2004/0246423 A1 | 12/2004 | Sasabayashi et al. | |
| 2005/0122441 A1* | 6/2005 | Shimoshikiryoh | 349/38 |
| 2005/0122445 A1* | 6/2005 | Park et al. | 349/106 |
| 2005/0140612 A1* | 6/2005 | Baek | 345/83 |
| 2006/0007376 A1 | 1/2006 | Fukuda et al. | |
| 2006/0098150 A1 | 5/2006 | Lee et al. | |
| 2006/0187386 A1* | 8/2006 | Roh | 349/114 |
| 2007/0139589 A1 | 6/2007 | Roosendaal et al. | |
| 2007/0146608 A1 | 6/2007 | Jin et al. | |
| 2007/0146610 A1 | 6/2007 | Momoi et al. | |
| 2007/0200989 A1 | 8/2007 | Shinichi et al. | |
| 2007/0206141 A1 | 9/2007 | Lu et al. | |
| 2008/0002107 A1 | 1/2008 | Mak et al. | |

* cited by examiner

*Primary Examiner* — Brian Healy
*Assistant Examiner* — Peter Radkowski
(74) *Attorney, Agent, or Firm* — Morgan, Lewis & Bockius LLP

(57) ABSTRACT

Provided are an LCD device that can control a viewing angle freely and a manufacturing method thereof. The LCD device includes a first substrate, a second substrate, and an LC layer interposed between the first and second substrates. The LCD device further includes red, green, blue, and viewing angle controlling subpixels. These subpixels are driven in a VA mode. The red, green, and blue subpixels have a transflective structure. The viewing angle controlling subpixel has a transmissive or transflective structure.

9 Claims, 13 Drawing Sheets

<Related Art>

LIQUID CRYSTAL DISPLAY DEVICE AND MANUFACTURING METHOD THEREOF

This application is a divisional patent application of U.S. patent application Ser. No. 11/826,589, filed on Jul. 17, 2007, now U.S. Pat. No. 7,940,358 which claims the benefit of Korean Patent Application No. 10-2006-0126763, filed in Korea on Dec. 13, 2006, which are both hereby incorporated by reference in their entirety.

BACKGROUND OF THE INVENTION

1. Field of the Invention

The present invention relates to a liquid crystal display (LCD) device and a manufacturing method thereof.

2. Description of the Related Art

Recently, an LCD device, which is one of flat display devices in the limelight constantly, changes optical anisotropy by applying an electric field to liquid crystal (LC) having both fluidity of liquid and an optical property of a crystal. The LCD device has a small volume and low power consumption compared to a related art cathode ray tube (CRT), and can be manufactured in a large size and achieve high definition. Accordingly, the LCD device is widely used.

The LCD device can be classified into various mode LCD devices depending on the property of the LC and a pattern structure.

In detail, a twisted nematic mode LCD device controls a director by applying a voltage after the director is disposed such that the director is twisted by 90°. A multi-domain mode LCD device divides one pixel into a plurality of domains, changes a primary viewing angle direction of each domain to realize a wide viewing angle. An optically compensated birefringence (OCB) mode LCD device attaches a compensation film on an outer surface of a substrate to compensate for a phase difference of light depending on a progression direction of light. An in-plane switching (IPS) mode LCD device provides two electrodes on one substrate to allow a director to be twisted on a plane parallel to an alignment layer. A vertical alignment (VA) mode LCD device allows a long axis to be disposed perpendicularly to a plane of an alignment layer using negative type LC and a vertical alignment layer.

A study for allowing an LCD device to have a wide viewing angle as much as possible has been under active progress up to now, but recently, a study for an LCD device having a narrow viewing angle as well as a wide viewing angle is also under active progress.

For example, when an LCD device has only a wide viewing angle in the case where the LCD device is used in order to protect company secret or national secret, and private life, information may leak out to persons located at an adjacent position or private life of a user may be infringed.

For this reason, technology controlling an LCD device to allow an image to be viewed at a desired viewing angle at a desired time is under active progress.

FIG. 1 is a cross-sectional view of a related art LCD device that can selectively operate in a wide viewing angle mode and a narrow viewing angle mode.

Referring to FIG. 1, the related art LCD device selectively driven in a wide viewing angle mode and a narrow viewing angle mode is formed by attaching a first LC panel 11 and a second LC panel 12.

The first LC panel 11 includes a first substrate 10 and a second substrate 20 that face each other and are separated a predetermined distance from each other. A first LC layer 30 is interposed between the first and second substrates 10 and 20.

Though not shown, a thin film transistor (TFT) and a pixel electrode can be formed on an inner surface of the first substrate 10. A color filter and a common electrode can be formed on an inner surface of the second substrate 20.

A second LC panel 12 is formed on an outer surface of the second substrate 20.

The second LC panel 12 includes a third substrate 50 and a fourth substrate 60 that face each other and are separated a predetermined distance from each other. A second LC layer 70 is interposed between the third and fourth substrates 60 and 70.

Though not shown, a first electrode and a second electrode are formed on inner surfaces of the third and fourth substrates 50 and 60, respectively. The first and second electrodes are connected to a predetermined controller in order to apply an electric field to the second LC layer 70.

The second LC layer 70 is aligned horizontally or vertically by an applied electric field.

A first polarizer 81 is formed on an outer surface of the first substrate 10 of the first LC panel 11, and a second polarizer 82 is formed on an outer surface of the fourth substrate 60 of the second LC panel 12.

At least one polarizer can be further provided between the first LC panel 11 and the second LC panel 12.

When the LCD device is driven in a wide viewing angle mode, the second LC panel 12 immediately transmits an image formed by the first LC panel 11 regardless of whether an electric field is applied to the second LC panel 70.

When the LCD device is driven in a narrow viewing angle mode, the second LC panel 12 transmits light processed by the second LC panel 12 in a predetermined direction depending on whether a predetermined electric field is applied or not. Therefore, an image that is generated by the first LC panel 11 and passes through the second LC panel 12 can be viewed at a predetermined narrow viewing angle.

In the case where a viewing angle controlling LC panel is attached onto a main LC panel providing a primary image in order to control a viewing angle in a related art LCD device, the viewing angle controlling LC panel not only should be additionally manufactured, but also the thickness and weight of a product increase two or more times.

Also, misalign may occur when the viewing angle controlling LC panel and the main LC panel are attached to each other. Also, in the case where the LCD device is used in a wide viewing angle mode, light incident from a backlight assembly should passes through the viewing angle controlling LC panel. Accordingly, front brightness considerably reduces.

SUMMARY OF THE INVENTION

Accordingly, the present invention is directed to a liquid crystal display device and a manufacturing method thereof that substantially obviates one or more problems due to limitations and disadvantages of the related art.

An object of the present invention is to provide a liquid crystal display device that allows an excellent image quality even at a wide viewing angle and controls a viewing angle depending on a user's selection to allow an image to be viewed only at a narrow viewing angle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a liquid crystal display device including: a first substrate defining first to fourth subpixel regions, each subpixel region defining a reflection area and a transmission area; first to fourth thin film transistors formed in the first to fourth subpixel regions on the first substrate; first to third reflection electrodes electrically connected to the first to third thin film transistors, and formed in the reflection areas; first to third transmission electrodes electrically connected to the first to third thin film transistors, and formed in the transmission areas; a pixel electrode electrically connected to the fourth thin film transistor; a second substrate facing the first substrate; a color filter layer formed on regions corresponding to the first to third subpixel regions; a common electrode formed on an entire surface of the second substrate; at least one pattern formed long to cross the fourth subpixel region on the second substrate; and a liquid crystal layer interposed between the first substrate and the second substrate.

In another aspect of the present invention, there is provided a method for manufacturing a liquid crystal display device, the method including: forming gate lines and data lines crossing each other on a first substrate to define first to fourth subpixel regions; forming first to fourth thin film transistors on the first to fourth subpixel regions; forming first to third reflection electrode electrically connected to the first to third thin film transistors on reflection areas of the first to third subpixel regions; forming first to third transmission electrodes electrically connected to the first to third thin film transistors in transmission areas of the first to third subpixel regions and forming a pixel electrode electrically connected to the fourth thin film transistor in the fourth subpixel region; forming a color filter layer in regions of a second substrate that faces the first substrate and corresponds to the first to third subpixel regions; forming a common electrode on an entire surface of the second substrate; forming rib patterns long in a first direction in the fourth subpixel region on the second substrate; and forming a liquid crystal layer between the first substrate and the second substrate.

The present invention provides flexibility in an aspect of a security range to a user. According to the present invention, an LCD device can be exclusively used for one person, and provide a high quality image and achieve security conveniently even when two or more persons view the image using the LCD device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

An LCD device according to the present invention includes a first substrate, a second substrate, and an LC layer interposed between the first and second substrates. The LCD device also includes red subpixel Pr, a green subpixel Pg, a blue subpixel Pb, and a viewing angle controlling subpixel Pv.

The red subpixel Pr, green subpixel Pg, and blue subpixel Pb include red, green, and blue color filters, respectively. The viewing angle controlling subpixel Pv may or may not include a white color filter.

The red subpixel Pr, green subpixel Pg, blue subpixel Pb, and viewing angle controlling subpixel Pv are driven in a vertical alignment mode.

According to a first embodiment of the present invention, each of the red subpixel Pr, green subpixel Pg, and blue subpixel Pb has a transflective structure, and the viewing angle controlling subpixel Pv has a transmissive structure.

According to a second embodiment of the present invention, each of the red subpixel Pr, green subpixel Pg, and blue subpixel Pb has a transflective structure, and the viewing angle controlling subpixel Pv has a transflective structure.

An LCD device according to the present invention can be switched between a narrow viewing mode and a wide viewing angle mode by selectively controlling the viewing angle controlling subpixel Pv in an on-state and an off-state.

In an LCD device according to the present invention, the red subpixel Pr, green subpixel Pg, blue subpixel Pb, and viewing angle controlling subpixel Pv can be arranged in various shapes. For example, the red subpixel Pr, green subpixel Pg, blue subpixel Pb, and viewing angle controlling subpixel Pv can be arranged in a quad type disposed in two by two, or in a stripe type disposed in a line.

The present invention provides flexibility in an aspect of a security range to a user. According to the present invention, an LCD device can be exclusively used for one person, and provide a high quality image and achieve security conveniently even when two or more persons view the image using the LCD device.

Also, the LCD device can provide excellent image quality in an outdoor space where natural light is strong and even in an indoor space where illumination from a lighting apparatus is strong. Since natural light or light from a lighting apparatus is used for an LCD device, power consumption can reduce.

An LCD device according to the present invention will be described in detail with reference to the accompanying drawings.

Figure 1:
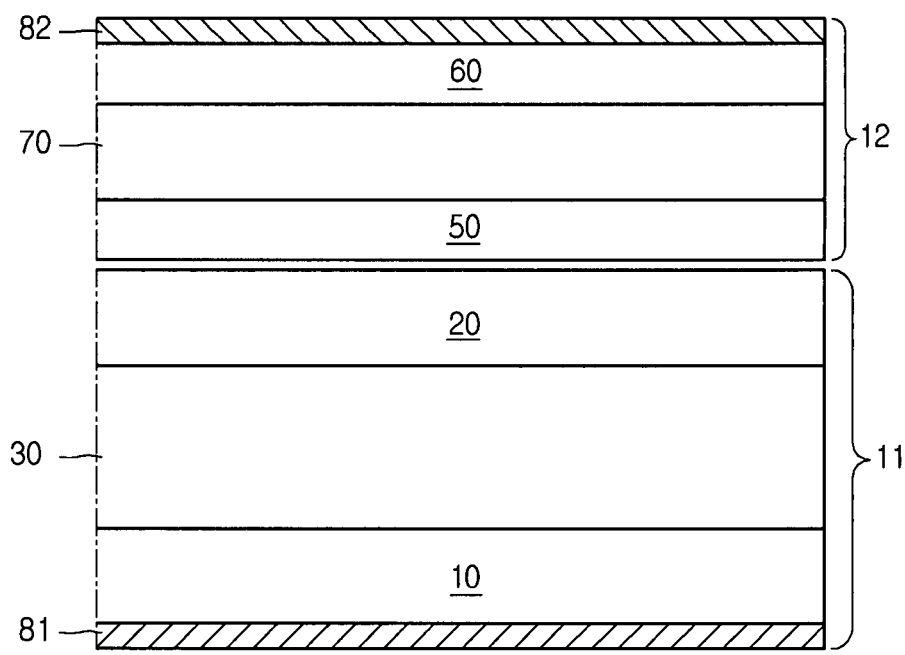
FIG. 1 is a cross-sectional view of a related art LCD device that can selectively operate in a wide viewing angle mode and a narrow viewing angle mode.
Figure 2:
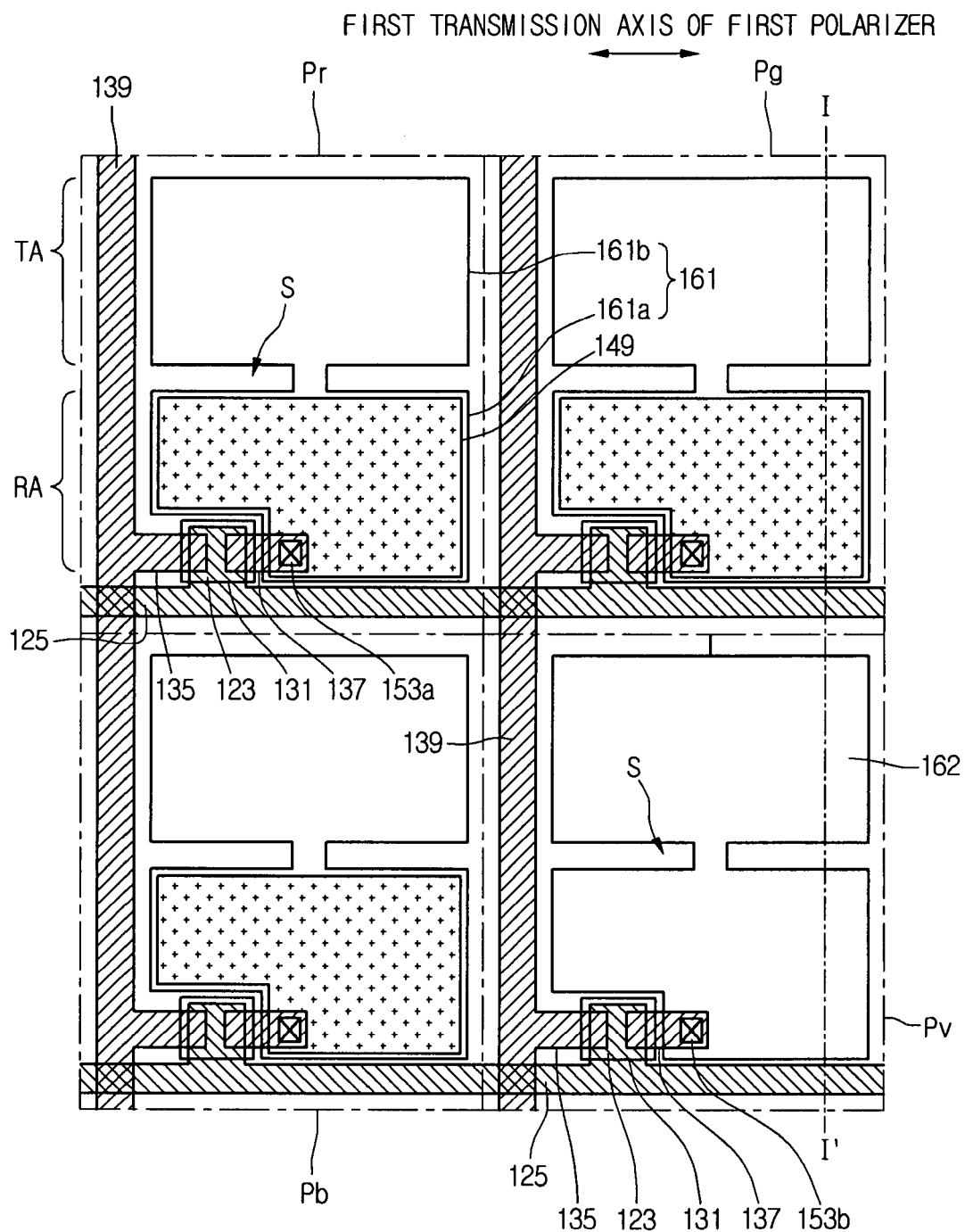
FIG. 2 is a plan view illustrating a pixel of an LCD device according to a first embodiment of the present invention.
Figure 3:
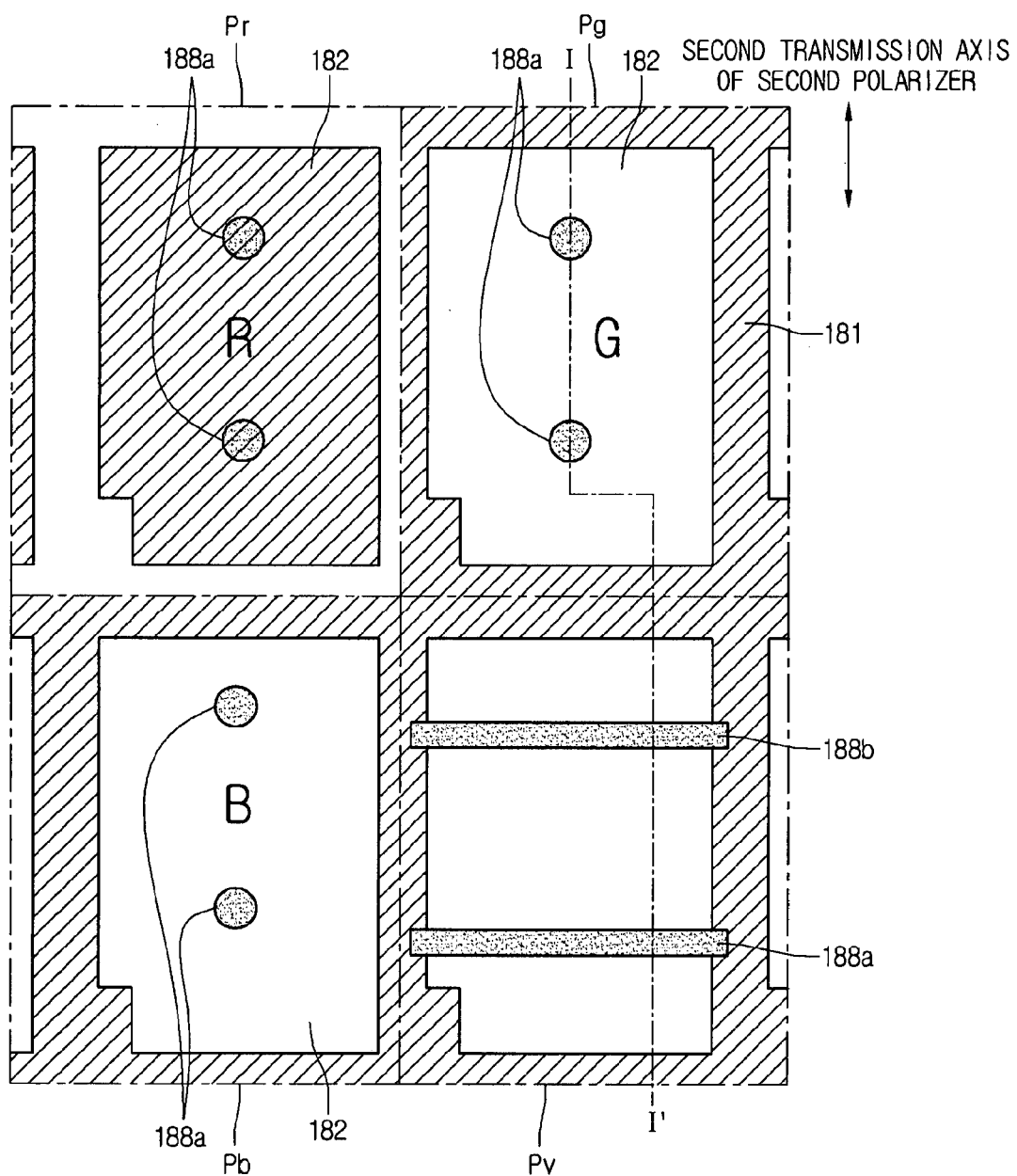
FIG. 3 is a plan view of a second substrate corresponding to the pixel of the LCD device of FIG. 2.
Figure 4:
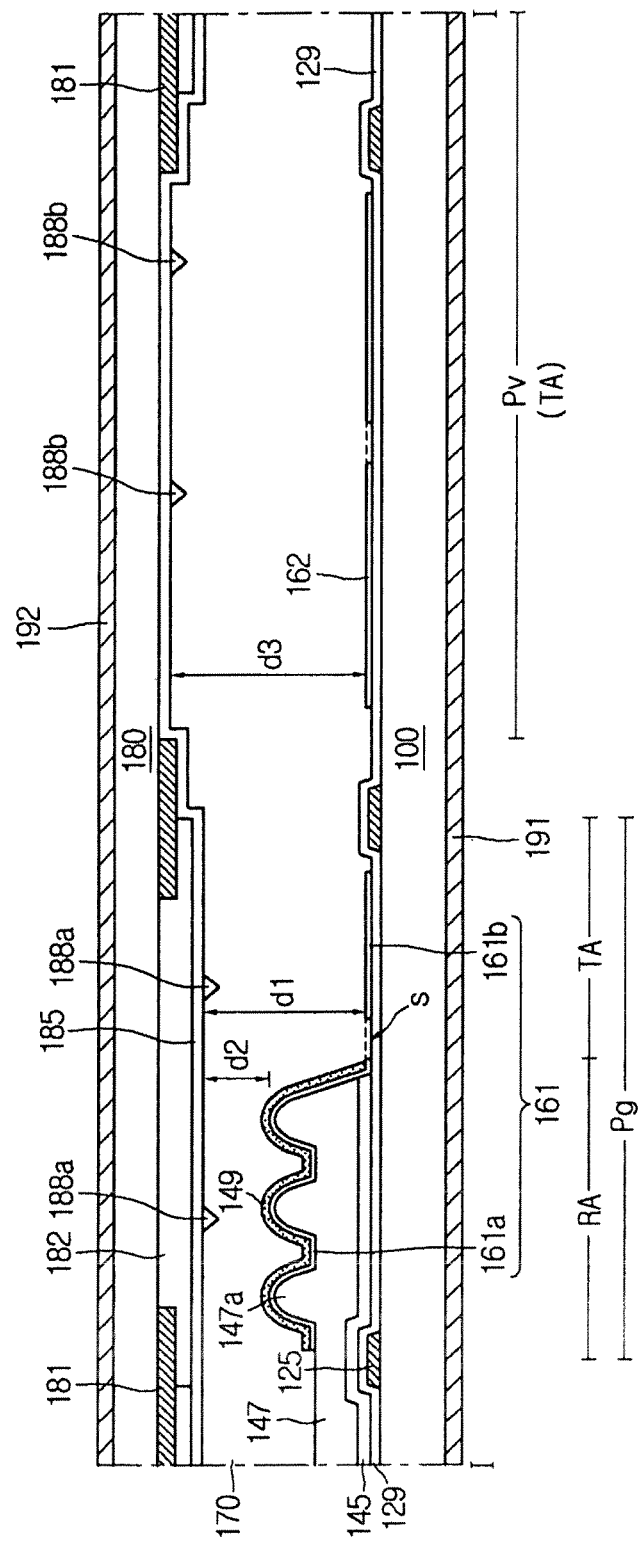
FIG. 4 is a cross-sectional view taken along a line I-I' of FIGS. 2 and 3.

FIG. 2 is a plan view illustrating a pixel of an LCD device according to a first embodiment of the present invention, FIG. 3 is a plan view of a second substrate corresponding to the pixel of the LCD device of FIG. 2, and FIG. 4 is a cross-sectional view taken along a line I-I' of FIGS. 2 and 3.

Referring to FIGS. 2 to 4, the LCD device includes the red subpixel Pr, green subpixel Pg, blue subpixel Pb, and viewing angle controlling subpixel Pv driven in a vertical alignment mode.

LC molecules contained in portions of an LC layer that correspond to the red subpixel Pr, green subpixel Pg, blue subpixel Pb, and viewing angle controlling subpixel Pv are vertically aligned.

The LC layer 170 includes nematic LC and LC molecules having negative dielectric anisotropy.

The LCD device includes a first control unit for driving the red subpixel Pr, green subpixel Pg, and blue subpixel Pb, and a second control unit for driving the viewing angle controlling subpixel Pv.

A narrow viewing angle mode and a wide viewing angle mode can be switched to each other by selectively driving the viewing angle controlling subpixel Pv in an on-state and an off-state through the second control unit.

The red subpixel Pr, green subpixel Pg, and blue subpixel Pb have a transflective structure, and the viewing angle controlling subpixel Pv has a transmissive structure.

Each of the transflective red subpixel Pr, green subpixel Pg, and blue subpixel Pb has a reflection area RA and a transmission area TA within the subpixel.

Each of the transflective red subpixel Pr, green subpixel Pg, and blue subpixel Pb has a dual cell gap. A cell gap d1 of the transmission area TA is about twice greater than a cell gap d2 of the reflection area RA.

The viewing angle controlling subpixel Pv has a transmissive structure. A cell gap d3 of the viewing angle controlling subpixel Pv is about twice greater than the cell gap d2 of the reflection areas RA of the red subpixel Pr, green subpixel Pg, and blue subpixel Pb.

The cell gap d3 of the viewing angle controlling subpixel Pv can be greater than the cell gaps d1 of the transmission areas of the red subpixel Pr, green subpixel Pg, and blue subpixel Pb.

The transflective red subpixel Pr, green subpixel Pg, and blue subpixel Pb can be formed in patterned vertical alignment (PVA) or multi domain vertical alignment (MVA) to realize a wide viewing angle in a wide viewing angle mode.

In the PVA, a common electrode having a predetermined pattern or a pixel electrode is formed in one subpixel to distort an electric field and realize a multi domain. LC molecules are aligned to be perpendicular to a substrate, and a voltage is applied to the pixel electrode and common electrode to freely lay down the LC molecules in various directions. Therefore, the same viewing angle characteristic is achieved for all directions.

In the MVA, a dielectric protrusion or rib is attached on one substrate to incline vertically aligned LC molecules by a predetermined slope in advance, and allows the LC molecules to be inclined further when a voltage is applied.

A vertical alignment mode LCD device according to the present invention can be applied to both the PVA LCD device and the MVA LCD device.

When the viewing angle controlling subpixel Pv is in an off-state, the LCD device is driven in a wide viewing angle mode, so an image realized using red subpixel Pr, green subpixel Pg, and blue subpixel Pb can be viewed in high quality at a wide viewing angle.

Here, the off-state of the viewing angle controlling subpixel Pv means that the viewing angle controlling subpixel Pv is not driven.

Since LC molecules contained in the viewing angle controlling subpixel Pv are aligned perpendicularly to a substrate and a first polarizer and a second polarizer cross each other perpendicularly before an electric field is formed, the viewing angle controlling subpixel Pv gets dark and does not have an influence on image quality of an image displayed on a screen by driving of red subpixel Pr, green subpixel Pg, and blue subpixel Pb. Therefore, an image can be viewed at a wide viewing angle.

On the other hand, when the viewing angle controlling subpixel Pv is in an on-state, the LCD device is driven in a narrow viewing angle mode, and light that passes through the viewing angle controlling subpixel Pv acts as light leakage at a side viewing angle by a birefringence effect of LC. Accordingly, an image realized by the red subpixel Pr, green subpixel Pg, and blue subpixel Pb can be viewed in high quality only at a narrow viewing angle, for example, at a front viewing angle.

An off-state of the viewing angle controlling subpixel Pv means that the viewing angle controlling subpixel Pv is driven.

When an electric field is formed between pixel electrodes and a common electrode formed on the first and second substrates, respectively, LC molecules contained in the viewing angle controlling subpixel Pv are twisted to be perpendicular to the electric field according to the property of the LC having negative dielectric anisotropy. The LC molecules have a bar shape, and refractive indexes of the long axis and short axis of each LC molecule are different from each other. Accordingly, when the LC molecules are arranged perpendicularly to the formed electric field, light passes laterally through the LC molecules and serves as lateral light leakage. Therefore, the viewing angle controlling subpixel Pv has a great influence on image quality of an image displayed on a screen by the driving of the red subpixel Pr, green subpixel Pg, and blue subpixel Pb. Therefore, an image can be viewed only at a narrow front viewing angle.

Also, a viewing angle range can be controlled by controlling a voltage applied to the viewing angle controlling subpixel Pv.

The first polarizer 191 having a first transmission axis is formed on an outer surface of the first substrate 100, and the second polarizer 192 having a second transmission axis is formed on an outer surface of the second substrate 180.

The first transmission axis may be perpendicular to the second transmission axis.

Referring to FIGS. 2 to 4, the first substrate 100 of the LCD device includes subpixels Pr, Pg, Pb, and Pv defined by a plurality of gate lines 125 and a plurality of data lines 139 crossing the plurality of gate lines 125.

Examples of a material that can be used for the gate line 125 include Cu, Al, an Al alloy (for example, AlNd), Mo, Cr, Ti, Ta, and MoW.

The gate line 125 can be formed in a multi-layered structure in which at least two metal layers are stacked.

Examples of a material that can be used for the data line 139 include Cu, Al, an Al alloy (for example, AlNd), Mo, Cr, Ti, Ta, and MoW.

Each of the red subpixel Pr, green subpixel Pg, and blue subpixel Pb of the subpixels includes a thin film transistor (TFT) formed at a crossing defined by each gate line 125 and each data line 139 to switch a voltage, and a first pixel electrode 161 connected to the TFT.

The first pixel electrode 161 includes a reflection area pixel electrode 161a and a transmission area pixel electrode 161b. A slit s is formed between the reflection area pixel electrode 161a and the transmission area pixel electrode 161b.

The slit s allows vertically aligned LC molecules to lie in a predetermined direction when they are driven.

The reflection areas RA of the red subpixel Pr, green subpixel Pg, and blue subpixel Pb include a reflection electrode 149 on or under the reflection area pixel electrode 161a in order to drive the LCD device in a transflective mode. The transmission areas TA of the subpixels include the transmission area electrode 161b as a transmission electrode.

The viewing angle controlling subpixel Pv of the subpixels includes a TFT formed at a crossing defined by each gate line 125 and each data line 139 to switch a voltage, and a second pixel electrode 162 connected to the TFT and formed within the viewing angle controlling subpixel Pv.

The red subpixel Pr, green subpixel Pg, and blue subpixel Pb have a transflective structure, and the viewing angle controlling subpixel Pv has a transmissive structure.

Examples of a material that can be used for the first and second pixel electrodes 161 and 162 include indium-tin-oxide (ITO) and indium-zinc-oxide (IZO).

The reflection electrode 149 is formed of metal having an excellent reflection characteristic such as aluminum-based metal.

The TFT includes a gate electrode 123 protruding from the gate line 125, a gate insulating layer 129 formed on an entire surface of the first substrate 100 including the gate electrode 123, a semiconductor layer 131 formed on a portion of the gate insulating layer 129 that corresponds to the gate electrode 123 and in which doped amorphous silicon n+a-Si is stacked, a source electrode 135 branching off from the data line 139 and formed in one end of the semiconductor layer 131, and a drain electrode 137 separated a predetermined distance from the source electrode 135 and formed in the other end of the semiconductor layer 131. The doped amorphous silicon n+a-Si is formed by ion-implanting amorphous silicon (a-Si) and impurity ions.

A passivation layer 145 is formed on the first substrate 100 to cover the TFT. A first contact hole 153a and a second contact hole 153b exposing a portion of the drain electrode 137 are formed in the passivation layer 145.

Also, the first pixel electrode 161 is connected to the drain electrode 137 via the first contact hole 153a, and the second pixel electrode 162 is connected to the drain electrode 137 via the second contact hole 153b.

The gate insulating layer 129 is located between the gate line 125 and the data line 139.

Examples of a material that can be used for the gate insulating layer 129 include silicon nitrides ($SiN_x$) and silicon oxide ($SiO_x$).

Examples of a material that can be used for the passivation layer 145 include silicon nitrides ($SiN_x$) and silicon oxide ($SiO_x$).

Also, examples of a material that can be used for the passivation layer 145 include Benzocyclobutene (BCB) and acryl-based material.

The reflection areas RA of the red subpixel Pr, green subpixel Pg, and blue subpixel Pb include an organic insulating layer 147 having unevenness patterns 147a for improving reflection efficiency even more. Also, the transmission areas TA of the subpixels include an etching groove formed in the organic insulating layer 147 for a dual cell gap. The reflection electrode 149 is formed along a curve of the unevenness patterns 147a on the unevenness patterns 147a to increase reflection efficiency.

The transflective LCD device includes a dual cell gap in the reflection areas RA and the transmission areas TA using the etching groove formed in the transmission area TA of the organic insulating layer 147. A cell gap d1 of the transmission area TA is made about twice greater than a cell gap d2 of the reflection area RA to improve light efficiency of the reflection area RA and the transmission area TA.

Since the viewing angle controlling subpixel Pv does not include a color filter layer, a cell gap d3 of the viewing angle controlling subpixel Pv can be greater than the cell gaps of the red subpixel Pr, green subpixel Pg, and blue subpixel Pb.

Referring to FIGS. 3 and 4, the second substrate 180 on which a black matrix (BM) 181 and the color filter layer 182 are formed faces the first substrate 100. A common electrode 185 is formed on the second substrate 180.

The BM 181 is formed on a portion of the second substrate 180 that corresponds to light leakage regions of a TFT region, the gate line 125, the data line 139, and neighborhoods thereof to block light therefrom.

The BM 181 can be formed of metal such as $CrO_x$ and Cr having optical density of 3.5 or more, or a carbon-based organic material.

A red color filter 182 containing pigment realizing a red color is formed in the red subpixel Pr on the second substrate 180.

A green color filter 182 containing pigment realizing a green color is formed in the green subpixel Pg on the second substrate 180.

A blue color filter 182 containing pigment realizing a blue color is formed in the blue subpixel Pb on the second substrate 180.

A white color filter formed of a transparent insulating material is formed on the viewing angle controlling subpixel Pv on the second substrate 180, or a color filter may not be formed on the viewing angle controlling subpixel Pv.

An overcoat layer for planarizing a surface may or may not be formed on an entire surface of the second substrate 180.

The common electrode 185 is formed on the entire surface of the second substrate including the red subpixel Pr, green subpixel Pg, and blue subpixel Pb, and viewing angle controlling subpixel Pv.

Examples of a material that can be used for the common electrode 185 include indium-tin-oxide (ITO) and indium-zinc-oxide (IZO).

Also, a protrusion 188a for distorting an electric field to realize a multi domain effect is formed on the common electrode 185 of the red subpixel Pr, green subpixel Pg, and blue subpixel Pb. The protrusion 188a can be a dielectric.

The protrusion 188a can be provided to correspond to the centers of the reflection areas RA and the transmission area TA of the red subpixel Pr, green subpixel Pg, and blue subpixel Pb.

A long bar-shaped rib is formed in a first direction on the common electrode 185 of the viewing angle controlling subpixel Pv to maximize a viewing angle controlling effect.

The first direction can be parallel or perpendicular to a first transmission axis of a first polarizer 191.

The first direction can be parallel or perpendicular to a second transmission axis of a second polarizer 192.

Accordingly, since LC molecules of the viewing angle controlling subpixel Pv is laid down in a direction perpendicular to the first direction by the rib formed in the first direction when an electric field is applied to the LC layer 170, light leakage can be generated to left and right viewing angles.

Since the red subpixel Pr, green subpixel Pg, and blue subpixel Pb can drive LC molecules using a first pixel electrode slit s of the first substrate 100 and the protrusion 188a of the second substrate 180 when the LC molecules are driven, a multi domain effect can be realized, and the LCD device can be selectively driven in a reflection mode and a transmission mode.

Since the viewing angle controlling subpixel Pv can generate light leakage to left and right viewing angles by driving LC molecules in a direction perpendicular to the first direction using the slit s of a second pixel electrode 162 of the first substrate 100, and the rib 188b disposed in the first direction, a wide viewing angle mode and a narrow viewing angle mode can be selectively realized by controlling driving of the viewing angle controlling subpixel Pv.

Referring to FIG. 4, a first polarizer 191 is formed on an outer surface of the first substrate 100 of the LCD device, and a second polarizer 192 is formed on an outer surface of the second substrate 180.

The first polarizer 191 has a first transmission axis, and the second polarizer 192 has a second transmission axis. The first and transmission axes may be perpendicular to each other.

The first transmission axis of the first polarizer 191 is parallel or perpendicular to the first direction, which is a long direction of the rib 188b of the viewing angle controlling subpixel Pv.

During a wide viewing angle mode, the viewing angle controlling subpixel Pv of the LCD device is not driven, and a black voltage or a no voltage is applied to the second pixel electrode 162 of the viewing angle controlling subpixel Pv, so that the viewing angle controlling subpixel Pv becomes a black state.

That is, the LC molecules are arranged perpendicularly to the substrate, and perpendicular to the first transmission axis of the first polarizer 191 and the second transmission axis of the second polarizer 192, so that light is blocked by the second polarizer 192 and the viewing angle controlling subpixel Pv becomes a black state when the viewing angle controlling subpixel Pv is not driven.

During a narrow viewing angle mode, the viewing angle controlling subpixel Pv of the LCD device is driven, a proper voltage is applied to the second pixel electrode 162 of the viewing angle controlling subpixel Pv, a vertical electric field is applied to a portion of the LC layer 170 contained in the viewing angle controlling subpixel Pv, and vertically arranged LC molecules are laid down in a direction perpendicular to the first direction of the rib 188b. Accordingly, a black state is maintained at a front side regardless of voltage application, and a phase delay of light is generated by birefringence of the LC molecules at an inclination angle, so that light leakage is generated at left and right viewing angles.

That is, when a predetermined voltage is applied to the second pixel electrode 162 to generate a vertical electric field between the second pixel electrode 162 and the common electrode 185, the LC molecules are laid down in a predetermined direction, and light that has passed through the first transmission axis of the first polarizer 191 is delayed in its phase by the LC molecules to pass through the second transmission axis of the second polarizer 192, so that light leakage is observed at side viewing angles.

Though not shown, an LCD device according to the present invention includes a first control unit for driving the red subpixel Pr, green subpixel Pg, and blue subpixel Pb to provide a desired image, and a second control unit for driving the viewing angle controlling subpixel Pv to allow the image to be viewed only at a desired viewing angle.

The second control unit can control a range of the viewing angel by controlling intensity of an electric field applied to the viewing angle controlling subpixel Pv.

Figure 5:
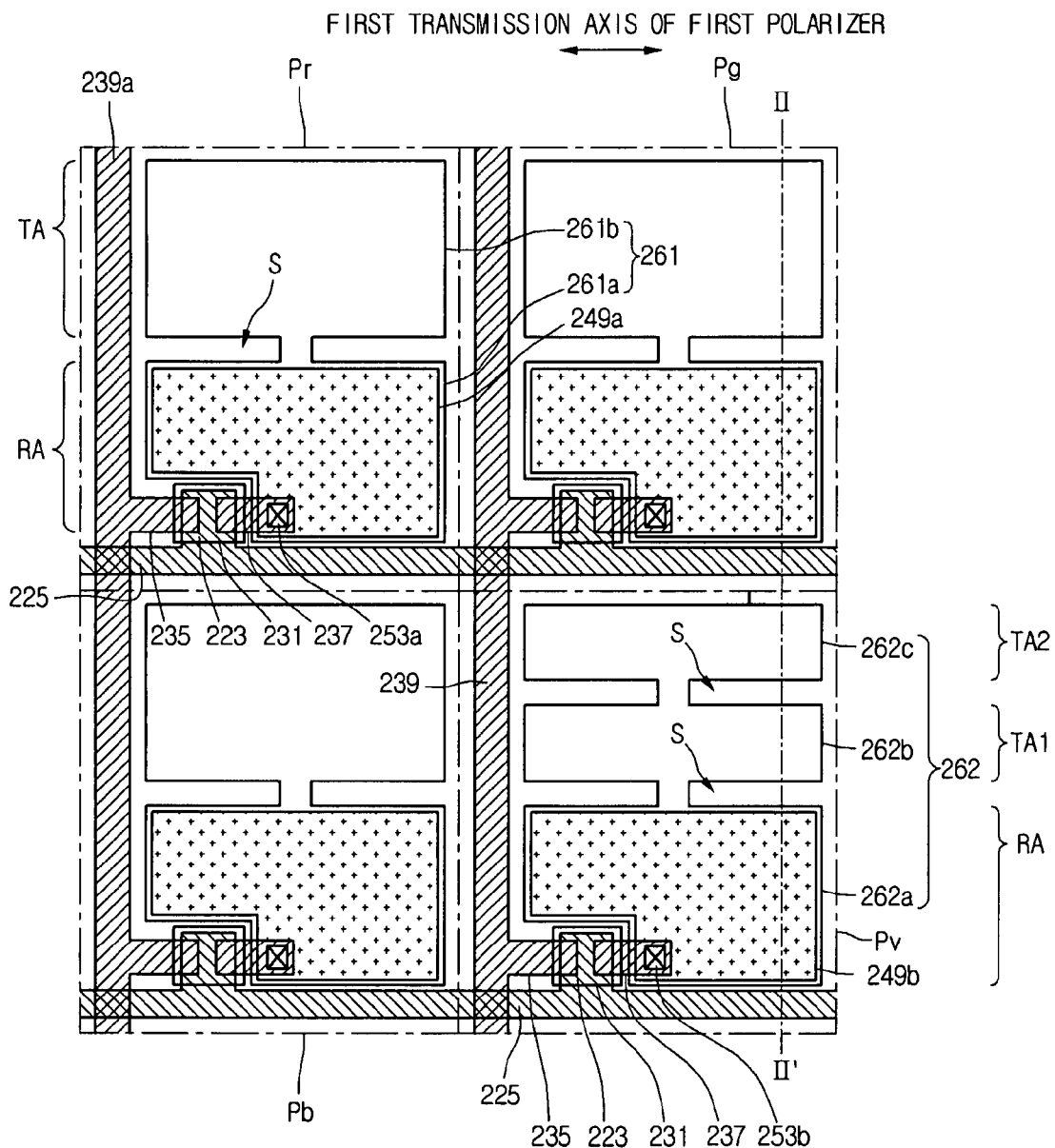
FIG. 5 is a plan view illustrating a pixel of an LCD device according to a first embodiment of the present invention.
Figure 6:
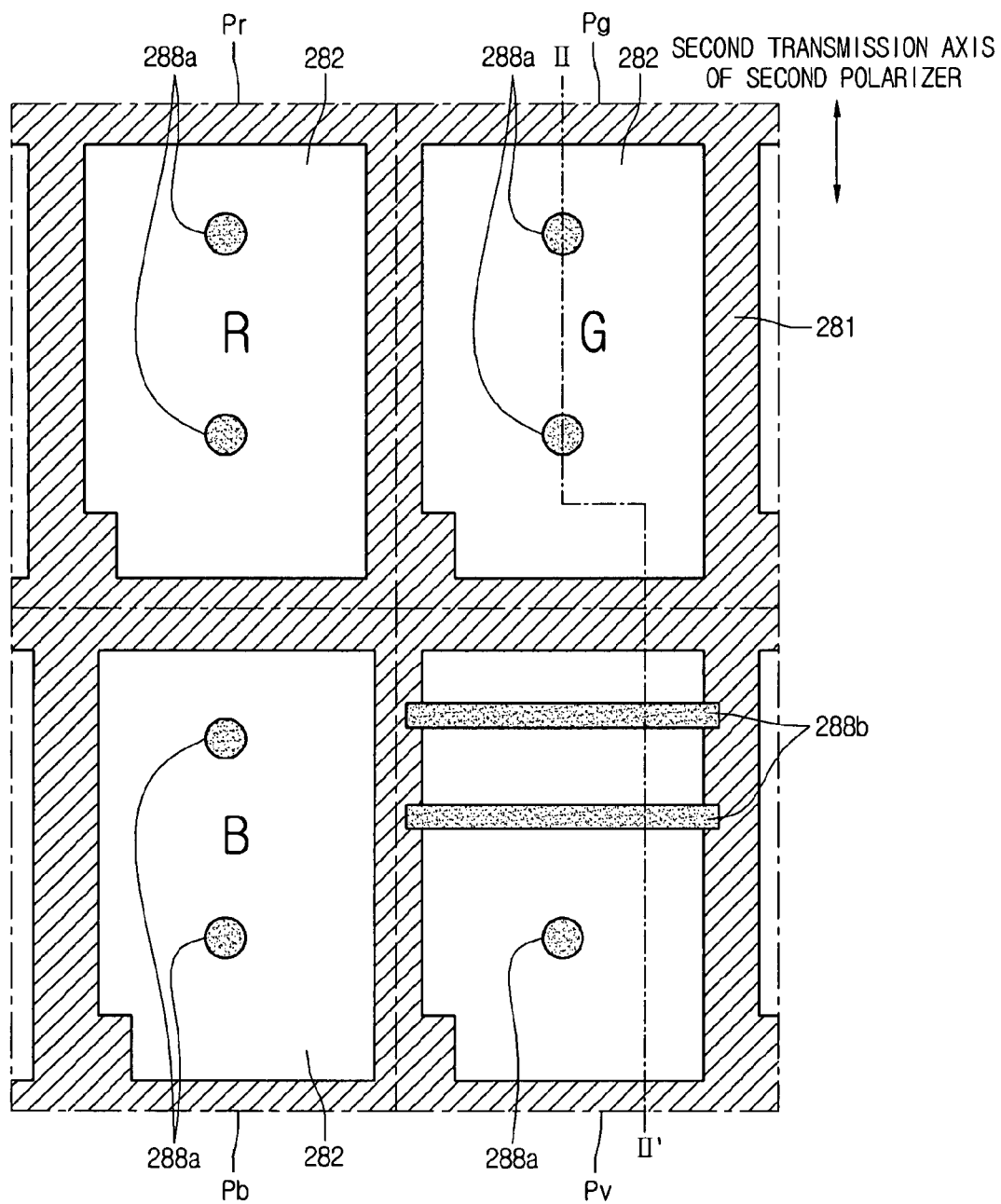
FIG. 6 is a plan view of a second substrate corresponding to the pixel of the LCD device of FIG. 5.
Figure 7:
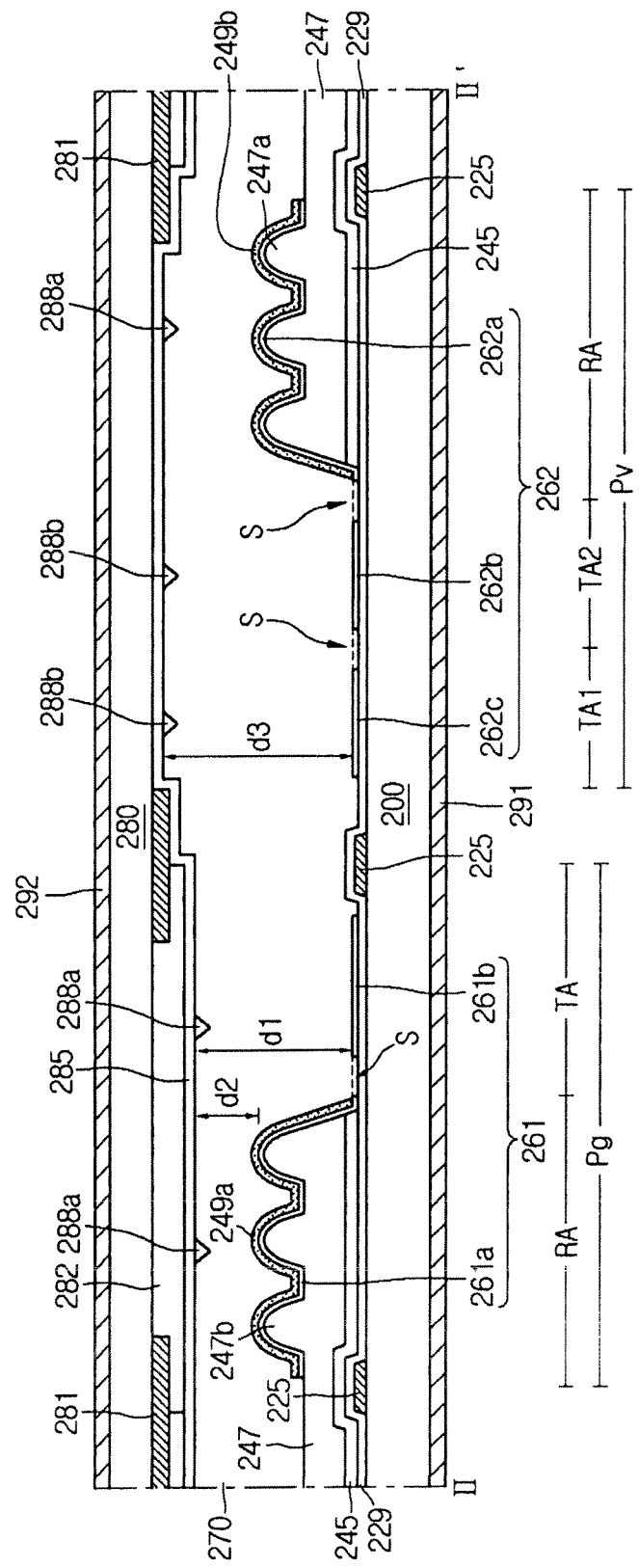
FIG. 7 is a cross-sectional view taken along a line II-II' of FIGS. 5 and 6.

FIG. 5 is a plan view illustrating a pixel of an LCD device according to a first embodiment of the present invention, FIG. 6 is a plan view of a second substrate corresponding to the pixel of the LCD device of FIG. 5, and FIG. 7 is a cross-sectional view taken along a line II-II' of FIGS. 5 and 6.

Here, since a portion of the viewing angle controlling subpixel is modified in the second embodiment, detailed description of the same part as that of FIGS. 2 to 4 are omitted.

Referring to FIGS. 5 to 7, the LCD device includes a red subpixel Pr, a green subpixel Pg, and a blue subpixel Pb, and a viewing angle controlling subpixel Pv. The red subpixel Pr, green subpixel Pg, blue subpixel Pb, and viewing angle controlling subpixel Pv are driven in a VA mode.

The LC molecules contained in portions of the LC layer that correspond to the red subpixel Pr, green subpixel Pg, blue subpixel Pb, and the viewing angle controlling subpixel Pv are vertically aligned.

The LC layer 270 includes nematic LC and LC molecules having negative dielectric anisotropy.

The LCD device includes a first control unit for driving the red subpixel Pr, green subpixel Pg, and blue subpixel Pb, and a second control unit for driving the viewing angle controlling subpixel Pv.

A narrow viewing angle mode and a wide viewing angle mode can be switched to each other by selectively driving the viewing angle controlling subpixel Pv in an on-state and an off-state through the second control unit.

The red subpixel Pr, green subpixel Pg, blue subpixel Pb, and the viewing angle controlling subpixel Pv have a transflective structure.

Each of the transflective red subpixel Pr, green subpixel Pg, blue subpixel Pb, and viewing angle controlling subpixel Pv has a reflection area RA and a transmission portion TA within the subpixel.

The transmission area TA of the viewing angle controlling subpixel Pv is designed for controlling a viewing angle, and the reflection area RA of the viewing angle controlling subpixel Pv is designed for enhancing reflection efficiency when external light leaks. Accordingly, an image can be improved.

Each of the transflective red subpixel Pr, green subpixel Pg, blue subpixel Pb, and viewing angle controlling subpixel has a dual cell gap. A cell gap $d_1$ of the transmission area TA is about twice greater than a cell gap $d_2$ of the reflection area RA.

The cell gap $d_3$ of the transmission area TA of the viewing angle controlling subpixel Pv can be greater than the cell gaps d1 of the transmission areas TA of the red subpixel Pr, green subpixel Pg, and blue subpixel Pb.

The VA mode LCD device according to the present invention can be applied to both a PVA mode LCD device and an MVA mode LCD device.

A protrusion 288a for distorting an electric field to realize a multi domain effect is formed on the common electrode 285 of the red subpixel Pr, green subpixel Pg, and blue subpixel Pb. The protrusion 288a can be a dielectric.

The protrusion 188a can be provided to correspond to the centers of the reflection areas RA and the transmission areas TA of the red subpixel Pr, green subpixel Pg, and blue subpixel Pb.

The protrusion 188a is further formed to correspond to the centers of the reflection area RA of the viewing angle controlling subpixel Pv.

A long bar-shaped rib 288b is formed in the first direction on the common electrode 285 of the transmission area TA of the viewing angle controlling subpixel Pv in order to maximize a viewing angle controlling effect.

The first direction can be parallel or perpendicular to a first transmission axis of a first polarizer 291 disposed on an outer surface of a first substrate 200.

The first direction can be parallel or perpendicular to a second transmission axis of a second polarizer 292 disposed on an outer surface of a second substrate 280.

The first transmission axis of the first polarizer 291 is parallel or perpendicular to the first direction, which is a long direction of the rib 288b of the viewing angle controlling subpixel Pv.

Accordingly, since LC molecules of the viewing angle controlling subpixel Pv is laid down in a direction perpendicular to the first direction by the rib 288b formed in the first direction when an electric field is applied to the LC layer 270, light leakage can be generated to left and right viewing angles.

The viewing angle controlling subpixel Pv includes a second pixel electrode 262 formed on the first substrate 200. The second pixel electrode 262 includes a reflection area pixel electrode 262a formed in a reflection area of the viewing angle controlling subpixel Pv, a first transmission pixel electrode 262b and the second transmission area pixel electrode 262c formed in a transmission area TA.

The transmission area TA of the viewing angle controlling subpixel Pv is divided into a first transmission area TA1 and a second transmission area TA2. A slit s is formed in a boundary between the first transmission area pixel electrode 262b formed on the first transmission area TA1 and the second transmission area pixel electrode 262c.

Since the viewing angle controlling subpixel Pv can generate light leakage to left and right viewing angles by driving LC molecules in a direction perpendicular to the first direction using the slit s of the second pixel electrode 262 of the first substrate 200, and the rib 288b disposed in the first direction, a wide viewing angle mode and a narrow viewing angle mode can be selectively realized by controlling driving of the viewing angle controlling subpixel Pv.

During a wide viewing angle mode, the viewing angle controlling subpixel Pv of the LCD device is not driven, and a black voltage or a no voltage is applied to the second pixel electrode 262 of the viewing angle controlling subpixel Pv, so that the viewing angle controlling subpixel Pv becomes a black state.

That is, the LC molecules are arranged perpendicularly to the substrate, and perpendicular to the first transmission axis of the first polarizer 291 and the second transmission axis of the second polarizer 292, so that light is blocked by the second polarizer 292 and the viewing angle controlling subpixel Pv becomes a black state when the viewing angle controlling subpixel Pv is not driven.

During a narrow viewing angle mode, the viewing angle controlling subpixel Pv of the LCD device is driven, a proper voltage is applied to the second pixel electrode 262 of the viewing angle controlling subpixel Pv, a vertical electric field is applied to a portion of the LC layer 270 contained in the viewing angle controlling subpixel Pv, and vertically arranged LC molecules in the first and second transmission area TA1 and TA2 are laid down in a direction perpendicular to the first direction of the rib 288b. Accordingly, a black state is maintained at a front side regardless of voltage application, and a phase delay of light is generated by birefringence of the LC molecules at an inclination angle, so that light leakage is generated at left and right viewing angles.

That is, when a predetermined voltage is applied to the second pixel electrode 262 to generate a vertical electric field between the second pixel electrode 262 and the common electrode 285, the LC molecules are laid down in a predetermined direction, and light that has passed through the first transmission axis of the first polarizer 291 is delayed in its phase by the LC molecules to pass through the second transmission axis of the second polarizer 292, so that light leakage is observed at side viewing angles.

Though not shown, an LCD device according to the present invention includes a first control unit for driving the red subpixel Pr, green subpixel Pg, and blue subpixel Pb to provide a desired image, and a second control unit for driving the viewing angle controlling subpixel Pv to allow the image to be viewed only at a desired viewing angle.

The second control unit can control a range of a viewing angle by controlling intensity of an electric field applied to the viewing angle controlling subpixel Pv.

Figure 8:
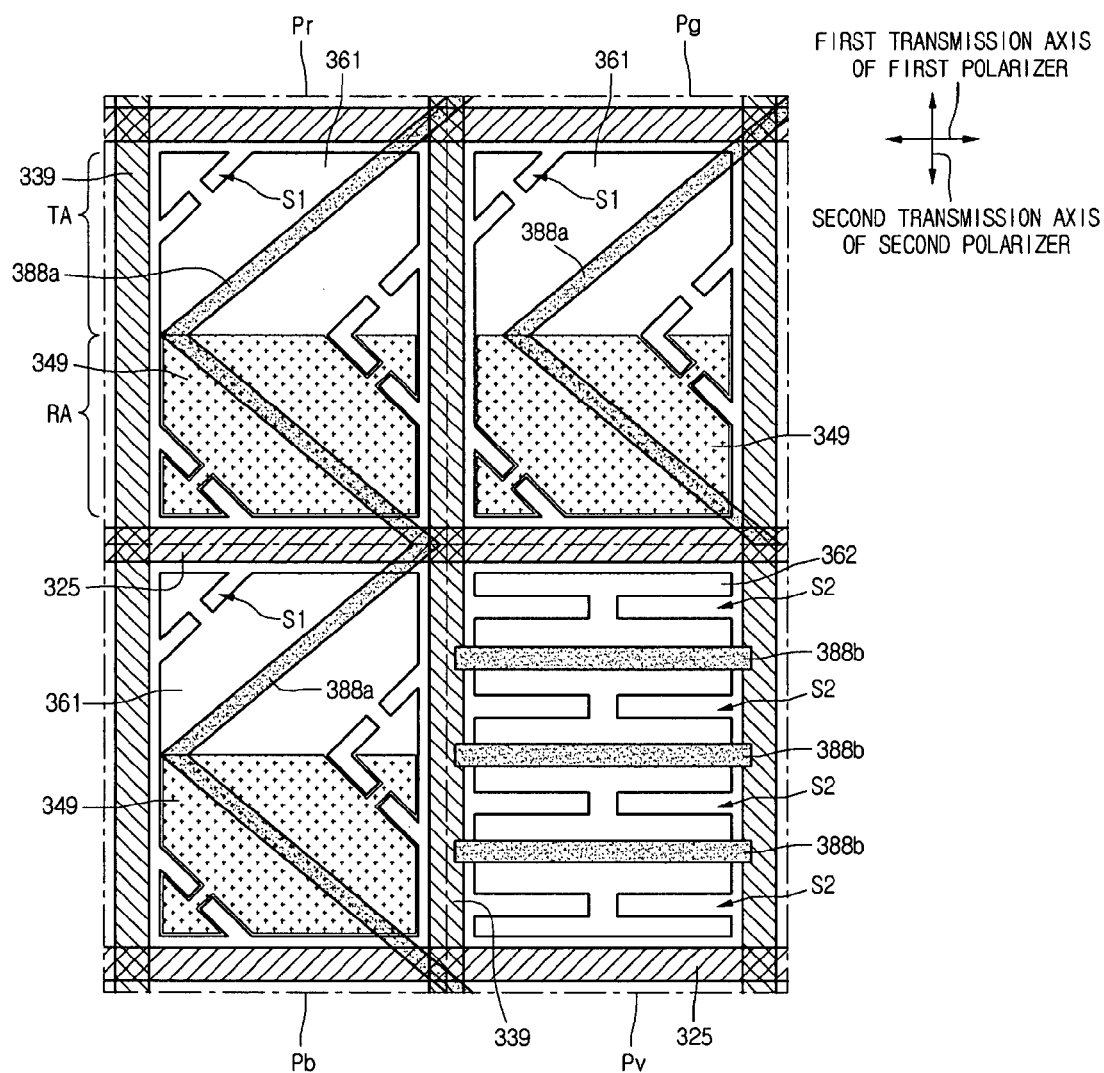
FIG. 8 is a schematic plan view illustrating a pixel of an LCD device according to a third embodiment of the present invention.

FIG. 8 is a schematic plan view illustrating a pixel of an LCD device according to a third embodiment of the present invention.

FIG. 8 schematically illustrates electrode structures of subpixels and rib patterns, and does not illustrate a thin film transistor.

Referring to FIG. 8, a pixel of the LCD device includes a red subpixel Pr, a green subpixel Pg, a blue subpixel Pb, and a viewing angle controlling subpixel Pv by a crossing of a gate line 325 and a data line 339, and is driven in a VA mode.

A first slit S1 long in a second direction and a third direction is formed in a first pixel electrode 361 of the red subpixel Pr, green subpixel Pg, and blue subpixel Pb of the first substrate.

A first rib 388a is formed in the second and third directions on the red subpixel Pr, green subpixel Pg, and blue subpixel Pb of the second substrate.

The second direction and the third direction are perpendicular to each other. The first rib 388a and the first slit S1 are formed in a bent structure within the subpixel.

That is, the first rib 388a and the first slit S1 are bent from the second direction to the third direction, and from the third direction to the second direction.

Portions of the first rib 388a and the first slit S1 in the transmission areas TA of the red subpixel Pr, green subpixel Pg, and blue subpixel Pb are formed in the second direction. Portions of the first rib 388a and the first slit S1 are formed in the second direction. The first rib 388a and the first slit S1 of the reflection area RA are formed in the third direction.

The second direction is inclined by 45° from the first transmission axis of the first polarizer, and the third direction is inclined by 135° from the first transmission axis.

Also, the second direction can be inclined by 45° from the second transmission axis of the second polarizer, and the third direction is inclined by 135° from the second transmission axis.

The first rib 388a and the first slit S1 determine a direction in which the LC molecules vertically arranged are laid down when an electric field is applied within a subpixel, and form a four-domain structure. The LC molecules are driven and laid down in different directions to realize a wide viewing angle.

A second slit S2 long in a first direction is formed in the second pixel electrode 362 of the viewing angle controlling subpixel Pv of the first substrate.

A second slit 388b long in the first direction is formed on the common electrode of the viewing angle controlling subpixel Pv of the first substrate.

Meanwhile, a first polarizer having a first transmission axis is formed on an outer surface of the first substrate, and a second polarizer having a second transmission axis is formed on an outer surface of the second substrate.

The first transmission axis and the second transmission axis may be perpendicular to each other.

The first direction can be parallel or perpendicular to the first transmission axis of the first polarizer.

The first direction can be parallel or perpendicular to the second transmission axis of the second polarizer.

Accordingly, since LC molecules of the viewing angle controlling subpixel Pv are laid down in a direction perpendicular to the first direction by the second rib 388b formed in the first direction when an electric field is applied to the LC layer, light leakage can be generated to left and right viewing angles.

Since the red subpixel Pr, green subpixel Pg, and blue subpixel Pb can drive LC molecules using the first slit S1 of the pixel electrode 361 of the first substrate and the first rib 388a of the second substrate when the LC molecules are driven, a multi domain effect can be realized, and the LCD device can be selectively driven in a reflection mode and a transmission mode.

Since the viewing angle controlling subpixel Pv can generate light leakage to left and right viewing angles by driving LC molecules in a direction perpendicular to the first direction using the second slit S2 disposed in the first direction of a second pixel electrode 382 of the first substrate, and the second rib 388b disposed in the first direction, a wide viewing angle mode and a narrow viewing angle mode can be selectively realized by controlling driving of the viewing angle controlling subpixel Pv.

Figure 9:
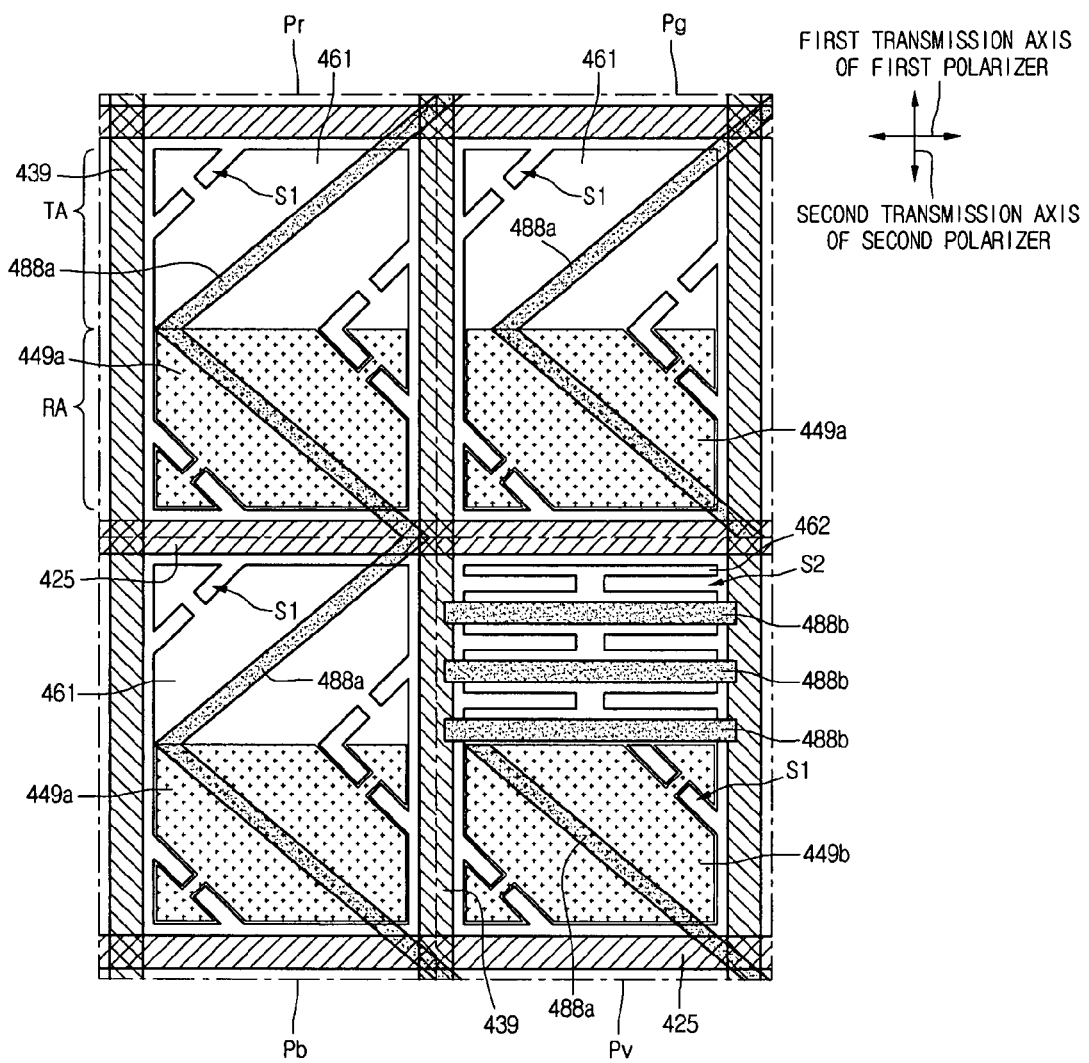
FIG. 9 is a plan view illustrating a pixel of an LCD device according to a fourth embodiment of the present invention.

FIG. 9 is a plan view illustrating a pixel of an LCD device according to a fourth embodiment of the present invention.

FIG. 9 schematically illustrates an electrode structure of subpixels and rib patterns and does not illustrate a thin film transistor. A detailed description of the same parts as those of FIG. 8 will be omitted.

Referring to FIG. 9, a pixel of the LCD device includes a red subpixel Pr, a green subpixel Pg, a blue subpixel Pb, and a viewing angle controlling subpixel Pv by a crossing of a gate line 425 and a data line 439, and is driven in a VA mode.

The red subpixel Pr, green subpixel Pg, blue subpixels Pb, and viewing angle controlling subpixel Pv have a transflective structure, and each of them includes a reflection area RA and a transmission area TA.

A first reflection electrode 449a is formed in the reflection areas RA of the red, green, and blue subpixels Pr, Pg, and Pb. A second reflection electrode 449b is formed in the reflection area RA of the viewing angle controlling subpixel Pv.

A first slit S1 long in a second direction and a third direction is formed in a first pixel electrode 461 of the red subpixel Pr, green subpixel Pg, and blue subpixel Pb of the first substrate.

A first rib 388a is formed in the second and third directions on the red subpixel Pr, green subpixel Pg, and blue subpixel Pb of the second substrate.

A second slit S2 long in a first direction is formed in the second pixel electrode 462 of the viewing angle controlling subpixel Pv on the first substrate.

A second rib 488b long in a first direction is formed on the common electrode of the viewing angle controlling subpixel Pv on the second substrate.

In the case where the viewing angle controlling subpixel Pv is controlled in a narrow viewing angle mode, LC molecules in a portion of an LC layer that is contained in the transmission area TA of the viewing angle controlling subpixel Pv are laid down in a direction perpendicular to the first direction. Light that has passed through a first polarizer generates light leakage to left and right viewing angles of the LCD device while it passes through the LC layer and a second polarizer.

Figure 10A:
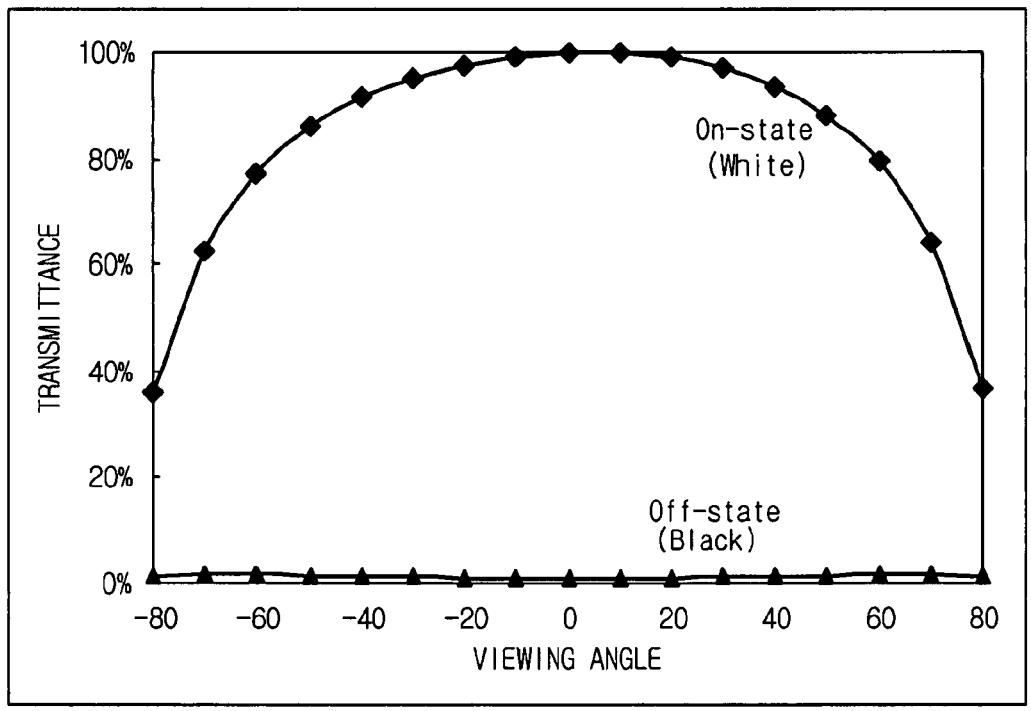
FIGS. 10A and 10B are graphs illustrating transmission characteristics in a wide viewing angle mode according to the present invention.
Figure 10B:
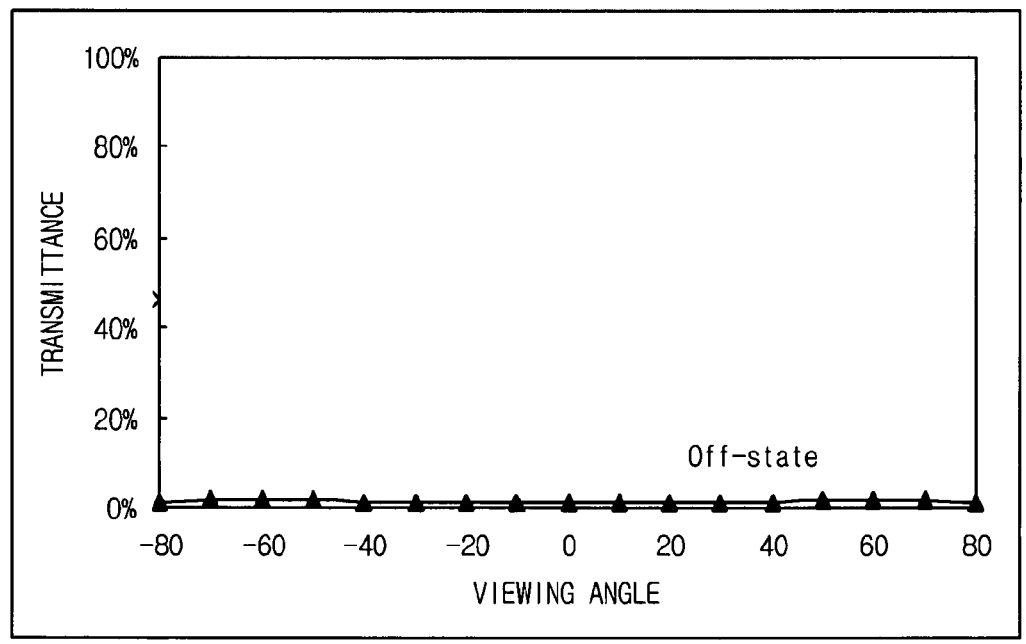

FIGS. 10A and 10B are graphs illustrating transmission characteristics in a wide viewing angle mode according to the present invention.

Figure 11:
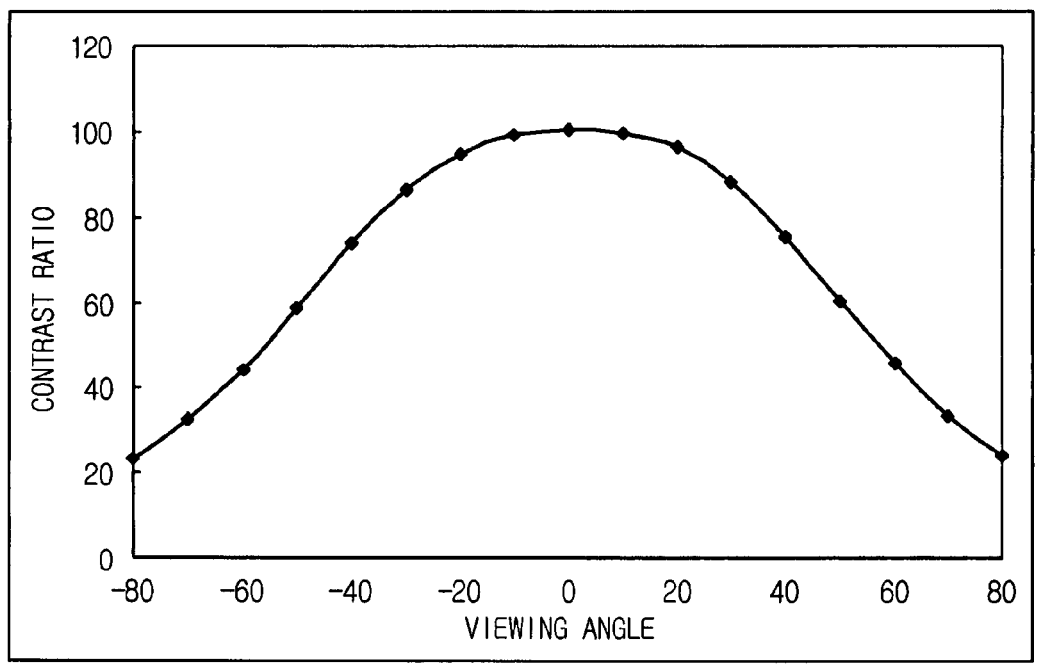
FIG. 11 is a graph illustrating a contrast-ratio depending on a viewing angle at a viewing angle controlling subpixel Pv during a wide viewing angle mode in an LCD device according to the present invention.

Also, FIG. 11 is a graph illustrating a contrast-ratio depending on a viewing angle at a viewing angle controlling subpixel Pv during a wide viewing angle mode in an LCD device according to the present invention.

FIG. 10A is a graph illustrating transmission characteristics when a voltage is applied and is not applied to the red, green, and blue subpixels Pr, Pg, and Pb during a wide viewing angle mode. FIG. 10B is a graph illustrating a transmission characteristic of the viewing angle controlling subpixel Pv during a wide viewing angle mode.

Referring to FIGS. 10A and 10B, transmittance of the viewing angle controlling subpixel Pv is close to 0% during a wide viewing angle mode, so that the viewing angle controlling subpixel Pv always becomes a black state. On the other hand, regarding transmission characteristics of on/off-states of the red, green, and blue subpixels Pr, Pg, and Pb, a transmission characteristic of an off-state becomes a black-state because transmittance thereof is close to 0% when a voltage is not applied, and a transmission characteristic of an on-state becomes a uniform white state over all of viewing angle ranges when a voltage is applied.

Also, a contrast ratio is uniform and excellent over all of viewing angles during a wide viewing angle mode (refer to the graph of FIG. 11).

Figure 12A:
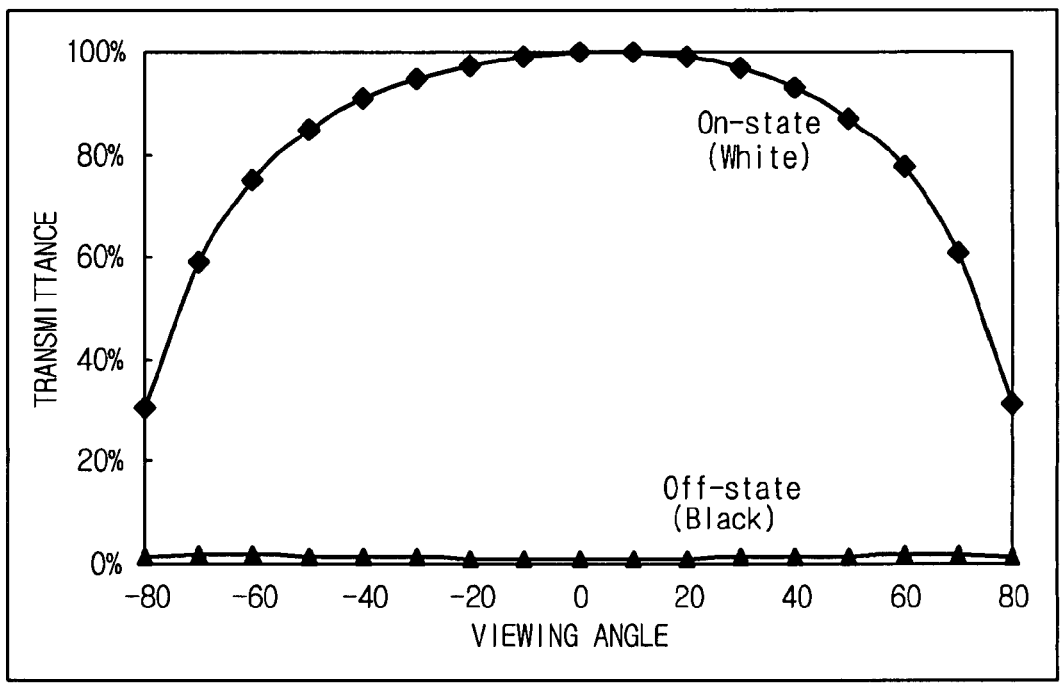
FIG. 12A is a graph illustrating transmission characteristics when a voltage is applied and a voltage is not applied to red, green, and blue subpixels Pr, Pg, and Pb in a narrow viewing angle mode.
Figure 12B:
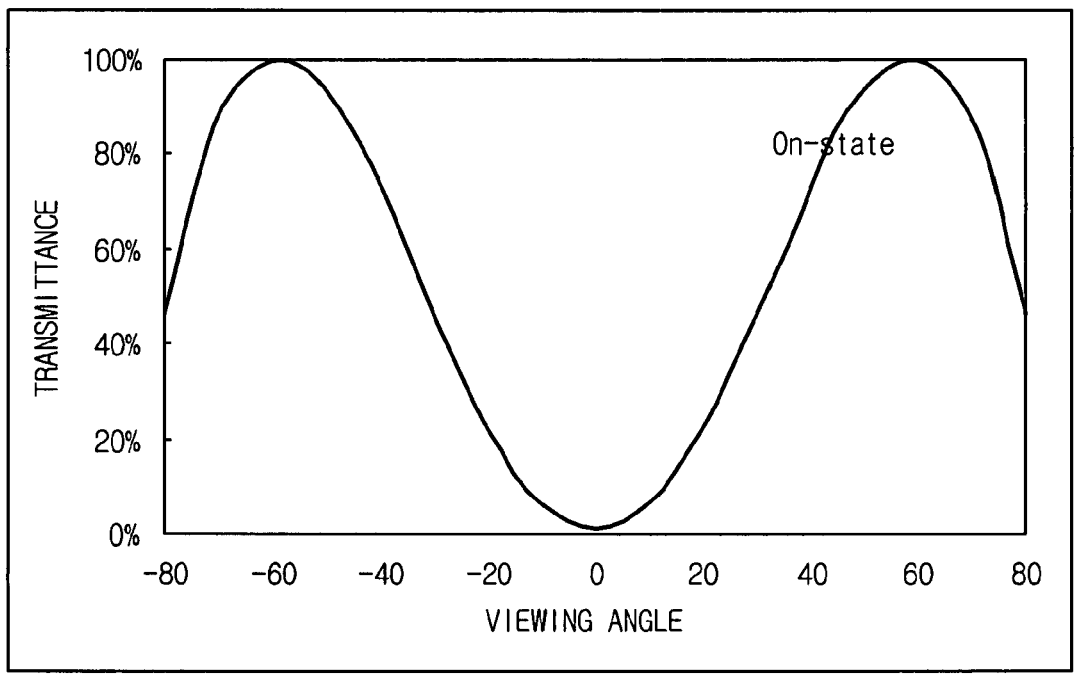
FIG. 12B is a graph illustrating transmission characteristics of a viewing angle controlling subpixel Pv in a narrow viewing angle mode.

FIG. 12A is a graph illustrating transmission characteristics when a voltage is applied and a voltage is not applied to red, green, and blue subpixels Pr, Pg, and Pb in a narrow viewing angle mode, and FIG. 12B is a graph illustrating transmission characteristics of a viewing angle controlling subpixel Pv in a narrow viewing angle mode.

Figure 13:
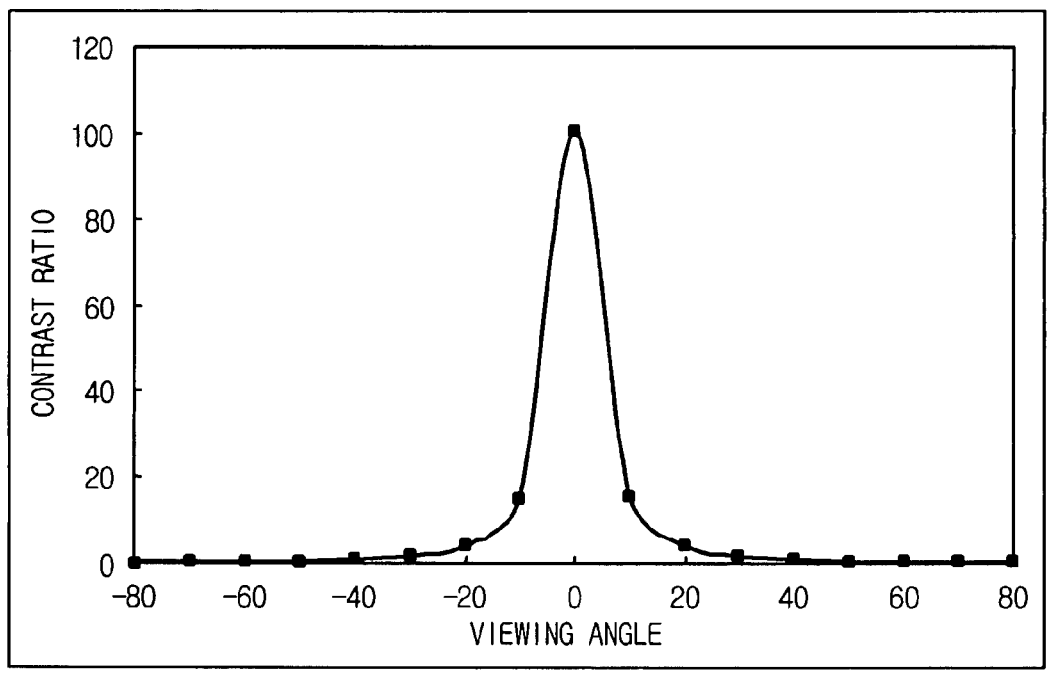
FIG. 13 is a graph illustrating a contrast-ratio depending on a viewing angle at a viewing angle controlling subpixel Pv during a narrow viewing angle mode in an LCD device according to the present invention.

FIG. 13 is a graph illustrating a contrast-ratio depending on a viewing angle at a viewing angle controlling subpixel Pv during a narrow viewing angle mode in an LCD device according to the present invention.

In an LCD device driven in a narrow viewing angle mode, a vertical electrical field is formed between the common electrode and the second pixel electrode in the viewing angle controlling subpixel Pv. LC molecules vertically arranged initially are laid down perpendicularly to the formed electric field.

Since the slit and rib formed in the viewing angle controlling subpixel Pv are parallel to or perpendicular to the first transmission axis, light that passes through the viewing angle controlling subpixel Pv has high transmittance in side directions.

Referring to FIGS. 12A and 12B, since an electric field is not formed between the common electrode and the first pixel electrodes of the red, green, and blue subpixels Pr, Pg, and Pb during an off-state, LC molecules aligned between the common electrode and the first pixel electrode do not move from the initial vertical arrangement, so that an image is viewed in a normally black mode.

Since an electric field is formed between the common electrode and the first pixel electrodes of the red, green, and blue subpixels Pr, Pg, and Pb during an on-state, the long axis of the LC molecules vertically aligned between the common electrode and the first pixel electrodes are arrange perpendicularly to the formed electric field.

Therefore, an image is viewed in a white mode on the whole at a front viewing angle, but retardation is greatly generated by the laid down LC molecules of the viewing angle controlling subpixel Pv in left and right viewing angle directions and contrast reduces, so that left/right viewing angles narrow, resulting in a narrow viewing angle.

Referring to FIG. 13, according to an LCD device according to the present invention, retardation is greatly generated in right/left viewing angle directions by the LC molecules contained in the viewing angle controlling subpixel Pv, so that a contrast ratio reduces, a contrast ratio is excellent only at a front viewing angle.

When a voltage applied to the viewing angle controlling subpixel Pv is properly controlled during a narrow viewing angle mode, intensity of an electric field formed between the common electrode and the second pixel electrode can be controlled, and thus retardation of the LC molecules in right/left directions can be controlled, so that a range of a narrow viewing angle can be controlled.

Accordingly, flexibility for a security range is provided to a user of an LCD device. Therefore, an LCD device according to the present invention can be exclusively used for one person. Also, even in the case where an LCD device according to the present invention is used for two or more persons, a viewing angle is controlled to a desired range, so that an image can be viewed in high quality without inconvenience while security is achieved.

Meanwhile, an LCD device according to the present invention can provide a variety of arrangements regarding an arrangement order of red, green, and blue subpixels Pr, Pg, and Pb, and a viewing angle controlling subpixel Pv. For example, the red, green, blue, and viewing angle controlling subpixel Pr, Pg, Pb, and Pv can be arranged horizontally, and an arrangement order can be disposed in random.

According to the present invention, an LCD device can be selectively realized in a wide viewing angle mode and a narrow viewing angle mode, so that private security can be achieved.

The present invention can control a viewing angle and provide excellent image quality even under a strong external light environment.

Also, the present invention controls a viewing angle by adding a viewing angle controlling subpixel within an LC panel, so that a process is simplified.

Also, according to the present invention, since a separated viewing angle controlling layer does not need to be added, light efficiency is excellent and a slim and lightweight LCD device can be provided.

Also, the present invention provides flexibility for a security range to a user. According to the present invention, an LCD device can be exclusively used for one person, and provide a high quality image and achieve personal security conveniently even when two or more persons view the image using the LCD device.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for manufacturing a liquid crystal display device, the method comprising:
    preparing a first substrate and a second substrate;
    forming gate lines and data lines crossing each other on the first substrate including first to fourth subpixel regions;
    forming first to fourth thin film transistors on the first to fourth subpixel regions;
    forming first to third reflection electrodes electrically connected to the first to third thin film transistors on reflection areas of the first to third subpixel regions;
    forming first to third transmission electrodes electrically connected to the first to third thin film transistors in transmission areas of the first to third subpixel regions and forming a pixel electrode electrically connected to the fourth thin film transistor in the fourth subpixel region;
    forming a color filter layer in regions of the second substrate that faces the first substrate and corresponds to the first to third subpixel regions;
    forming a common electrode on an entire surface of the second substrate;
    forming rib patterns long in a first direction in the fourth subpixel region on the second substrate;
    forming a liquid crystal layer between the first substrate and the second substrate,
    further comprising forming a dielectric protrusion on portions of the second substrate that correspond to the first to third subpixel regions,
    wherein the pixel electrode of the fourth subpixel region has slit patterns in the first direction, and
    wherein the first to third subpixels are selectively driven in a reflection mode and a transmission mode using a first pixel electrode slit of the first substrate and the protrusion of the second substrate, the fourth subpixel is selectively driven in a wide viewing angle mode and a narrow viewing angle mode using a second pixel electrode slit of the first substrate and a rib of the second substrate.

2. The method according to claim 1, wherein a first polarizer having a first transmission axis is disposed on an outer surface of the first substrate, and a second polarizer having a second transmission axis perpendicular to the first transmission axis is disposed on an outer surface of the second substrate.

3. The method according to claim 1, wherein the forming of the first to third reflection electrodes comprises forming a fourth reflection electrode electrically connected to the fourth thin film transistor in the reflection area of the fourth subpixel region.

4. The method according to claim 1, wherein the transmission electrodes and the reflection electrodes of the first to third subpixel regions have slit patterns long in a second direction inclined by 45° from the first direction, and a third direction perpendicular to the second direction.

5. The method according to claim 1, further comprising forming rib patterns long in a second direction inclined by 45° from the first direction and a third direction perpendicular to the second direction on portions of the second substrate that correspond to the first to third subpixel regions.

6. The method according to claim 1, wherein cell gaps of the transmission areas are twice greater than cell gaps of the reflection areas in the first to third subpixel regions.

7. The method according to claim 1, wherein a cell gap of the fourth subpixel region is greater than cell gaps of the first to third subpixel regions by a thickness of the color filter layer.

8. The method according to claim 1, wherein the reflection areas of the first to third subpixel regions have an organic insulating layer having unevenness patterns.

9. The method according to claim 1, wherein long axes of liquid crystal molecules contained in the liquid crystal layer are aligned perpendicularly to the first substrate.

* * * * *